United States Patent
Ram et al.

(10) Patent No.: US 7,471,720 B2
(45) Date of Patent: Dec. 30, 2008

(54) FREQUENCY AND TIMING SYNCHRONIZATION AND ERROR CORRECTION IN A SATELLITE NETWORK

(75) Inventors: Uzi Ram, Givat Elah (IL); Arik Keshet, Ramat Efal (IL); Daniel Keschet, Ein Vered (IL)

(73) Assignee: Gilat Satellite Networks, Inc., McLean, VA (US)

( * ) Notice: Subject to any disclaimer, the term of this patent is extended or adjusted under 35 U.S.C. 154(b) by 601 days.

(21) Appl. No.: 10/851,345

(22) Filed: May 24, 2004

(65) Prior Publication Data

US 2004/0234018 A1 Nov. 25, 2004

Related U.S. Application Data

(60) Provisional application No. 60/472,727, filed on May 23, 2003.

(51) Int. Cl.
H04B 3/36 (2006.01)
(52) U.S. Cl. ..................................................... 375/211
(58) Field of Classification Search ................. 375/211, 375/214, 215, 219, 358, 354; 455/24, 69; 370/226, 274, 315, 316, 492, 501
See application file for complete search history.

(56) References Cited

U.S. PATENT DOCUMENTS 4,932,072 A 6/1990 Toko

| | | | | |
|---|---|---|---|---|
| 5,303,393 | A * | 4/1994 | Noreen et al. | 455/3.02 |
| 2003/0147426 | A1 * | 8/2003 | Cronin et al. | 370/503 |
| 2003/0161281 | A1 * | 8/2003 | Dulin et al. | 370/328 |
| 2004/0143675 | A1 * | 7/2004 | Aust | 709/236 |

FOREIGN PATENT DOCUMENTS

| EP | 0412207 | 2/1991 |
|---|---|---|
| EP | 1030464 | 8/2000 |
| EP | 1246375 | 10/2002 |

OTHER PUBLICATIONS

Summary Description of Method for NCR Distribution, EMS Technologies, Annex 1 to TM-RCS Report to TM, Mar. 23, 2004, pp. 1-2.
TIA Document, IP Over Satellite (IPoS), TIA-1008, Oct. 2003pp. 1-202.

* cited by examiner

*Primary Examiner*—Sam K Ahn
(74) *Attorney, Agent, or Firm*—Banner & Witcoff, Ltd.

(57) ABSTRACT

An outgoing transmission carrier frequency at, for example, a remote terminal, may be adjusted based on a feature rate of an incoming transmission. The adjustment may compensate for error in the outgoing transmission carrier frequency. The incoming transmission may be from a satellite or hub, for example. The outgoing transmission may be the signal that is transmitted by an antenna, or the outgoing transmission may be converted to be at another carrier frequency such as a higher carrier frequency for ultimate transmission by an antenna. Also, a remote terminal may be synchronized to a satellite network with or without knowledge of the remote terminals' geographical location and with or without time stamps.

15 Claims, 4 Drawing Sheets

FREQUENCY AND TIMING SYNCHRONIZATION AND ERROR CORRECTION IN A SATELLITE NETWORK

CROSS-REFERENCE TO RELATED APPLICATIONS

The present application claims priority to U.S. Provisional patent Application Ser. No. 60/472,727, entitled "Satellite Frequency and Timing Synchronization and Correction," filed May 23, 2003, incorporated by reference herein as to its entirety.

BACKGROUND OF THE INVENTION

The most common topology of a satellite network is the star topology, in which a central hub broadcasts toward a plurality of remote terminals (such as very small aperture terminals, or VSATs) via a forward time-domain multiplexed (TDM) carrier, and the remote terminals communicate with the hub by return channel bursts. There are many common multiple access schemes, the choice of which involves a dilemma and a well-known trade-off. Contention-based random access (CRA) solutions, such as Slotted Aloha, tend to have short response-time per transaction. However, the throughput is limited theoretically to about 36% utilization of the available channel. Moreover, in order to achieve acceptable average delays (that are dominated by collisions and the need for re-transmissions), the practical load should be about 30%. A more bandwidth efficient access scheme would provide a collision-free approach. A simple fixed time-domain multiple-access (TDMA) scheme, where slot allocations are pre-determined, is not efficient in the traffic regime where the terminal return link needs are highly dynamic and variable.

A more popular approach is a "reservation-based" solution, in which the hub allocates time slots and frequencies to remote terminals according to the momentary needs of the remote terminals. This solution is also referred as a "reservation" system. In a reservation system, the remote terminals each transmit over a return control channel a "request for allocation" message to the hub whenever there is a need to transfer data to the hub. However, the repeated transmission of request for allocation messages imposes significant delay and added transmission overhead. A good design would try to keep the request for allocation messages very short on a special short-slots structure.

Multiple-access VSAT networks often involve complicated time and frequency synchronization aimed to align the burst transmissions into the pre-designed frequency and time slot scheme. It is particularly complicated to align the first transmission of a remote terminal when, for example, the remote terminal has just been powered up. Traditionally, synchronization for both burst-slot timing and frame timing is accomplished via synchronization time-stamps that are sent via the forward channel. This involves some over-head in the Forward channel. Moreover, it involves costly and complicated hardware in the central hub, for accurate insertions and stamping of these time stamps within the forward channel.

Moreover, existing reservation networks cannot deal with initial frequency errors that are more than a fraction of channel frequency spacing, and cannot tolerate burst-timing errors that are larger than slot time guard bands. To allow for proper timing, the remote terminals are typically provided with information about their own geographic location and satellite location (to determine the distance between the terminal and the satellite), as well as time-stamps. However, the geographic information requirement makes it difficult to provide for mobile remote stations, and makes setup more difficult and time consuming.

In addition, because there are typically relatively few satellites and hubs in a satellite network as compared with remote terminals, and because many remote terminals are intended to be sold to individuals, remote terminals are often manufactured with less expensive electronics than in satellites and hubs. For example, each of the satellites, hubs, and remote terminals has circuitry that generates its outgoing carrier frequency or frequencies. Although such circuitry may be extremely accurate in the satellites and hubs, the less expensive carrier frequency generation circuitry in the remote terminals may be subject to drift and/or other frequency error. Such errors can be problematic in that the various carrier frequencies used in a satellite network are often close together. Any substantial frequency error can result in miscommunication.

SUMMARY OF THE INVENTION

There is a need for ensuring that transmission frequency and timing are efficiently synchronized and managed among the various satellites, hubs, and remote terminals.

Therefore, aspects of the present invention allow for eliminating the periodic distribution over the forward channel of synchronization data (e.g., time stamps), for slot and/or frame synchronization of the return channel. Instead, slot and/or frame synchronization information is re-constructed at the remote terminal from the re-constructed reception data clock, its derivatives—byte clock, the MPEG Sync pulse (a pulse that occurs at the beginning of each 188-byte MPEG block), etc., and/or the re-constructed symbol clock (derived from, e.g., the baud rate of the received data) and its derivatives, and/or by proper burst timing error and burst frequency error feedback information from the hub. This is possible by using receivers configured to be able to receive initial bursts that are not necessarily aligned with time-slots, and by using timing feedback correction messages sent to the remote terminals from the hub.

According to further aspects of the present invention, efficient usage of satellite bandwidth resources may be maintained, while the incorporation of low-cost terminals with large initial frequency error is supported. This is possible by using receivers configured to be able to receive initial bursts that are not necessarily aligned with channel frequencies, and by using frequency feedback correction messages sent to the remote terminals from the hub. Furthermore, the system may support unknown geographic location of remote terminals, thus simplifying installations, and easing the support of transportable terminals.

Still further aspects of the present invention allow large initial burst-timing errors, and/or large initial burst frequency errors. Such initial frequency errors may, for instance, be limited only by the entire return-channel total bandwidth allocation. Thus, low cost transmitters, such as dielectric resonant oscillator (DRO)-based transmitters, with large initial frequency offsets, may now be more practically utilized in remote terminals.

Still further aspects of the present invention allow remote terminals to successfully operate even without prior knowledge of the remote terminal's geographical location or the delay of its transmission to the satellite or to the hub. This is because initial burst-timing alignment is not required. This greatly simplifies installation of remote terminals and increases their robustness. This feature of independence from geographical location may also be useful for incorporating mobile or transportable remote terminals into a satellite network.

There is also a need to reduce the potential for frequency error in outgoing transmissions from remote terminals. Although aspects of the present invention are discussed with regard to remote terminals, such aspects may be used in any communications equipment such as in satellites or hubs.

Therefore, further aspects of the present invention are directed to adjusting an outgoing transmission carrier frequency at, for example, a remote terminal, based on a feature rate of an incoming transmission (such as the baud rate) that serves as a global clock reference for all the remote terminals. The incoming transmission may be from a satellite or hub, for example. The outgoing transmission may be the signal that is transmitted by an antenna, or the outgoing transmission may be converted to be at another carrier frequency such as a higher carrier frequency for ultimate transmission by an antenna.

Further aspects of the present invention are directed to counting a predetermined number of pulses associated with the incoming transmission, and counting how many pulses of a locally-generated reference clock occur within the time period for counting the pulses of the incoming transmission. The pulses associated with the incoming transmission may be from a clock reconstructed from the incoming transmission. The reconstructed clock may have a pulse rate equal to, or otherwise related to, the feature rate of the incoming transmission. By comparing the actual number of reference clock pulses with an expected number of reference clock pulses, the error in the reference clock, compared to the reconstructed clock, may be determined and compensated for. The reference clock may then be used to generate the outgoing carrier frequency.

Still further aspects of the present invention are directed to counting a predetermined number of pulses of the reference clock, and counting how many pulses associated with the incoming transmission occur within the time period for counting the pulses of the reference clock. Again, by comparing the actual number of incoming transmission-related pulses are counted with an expected number of pulses, the error in the reference clock, compared to the reconstructed clock, may be determined and compensated for. The reference clock may then be used to generate the outgoing carrier frequency.

These and other aspects of the invention will be apparent upon consideration of the following detailed description of illustrative embodiments. Although the invention has been defined using the appended claims, these claims are illustrative in that the invention is intended to include the elements and steps described herein in any combination or subcombination. Accordingly, there are any number of alternative combinations for defining the invention, which incorporate one or more elements from the specification, including the description, claims, and drawings, in various combinations or subcombinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Figure 1:
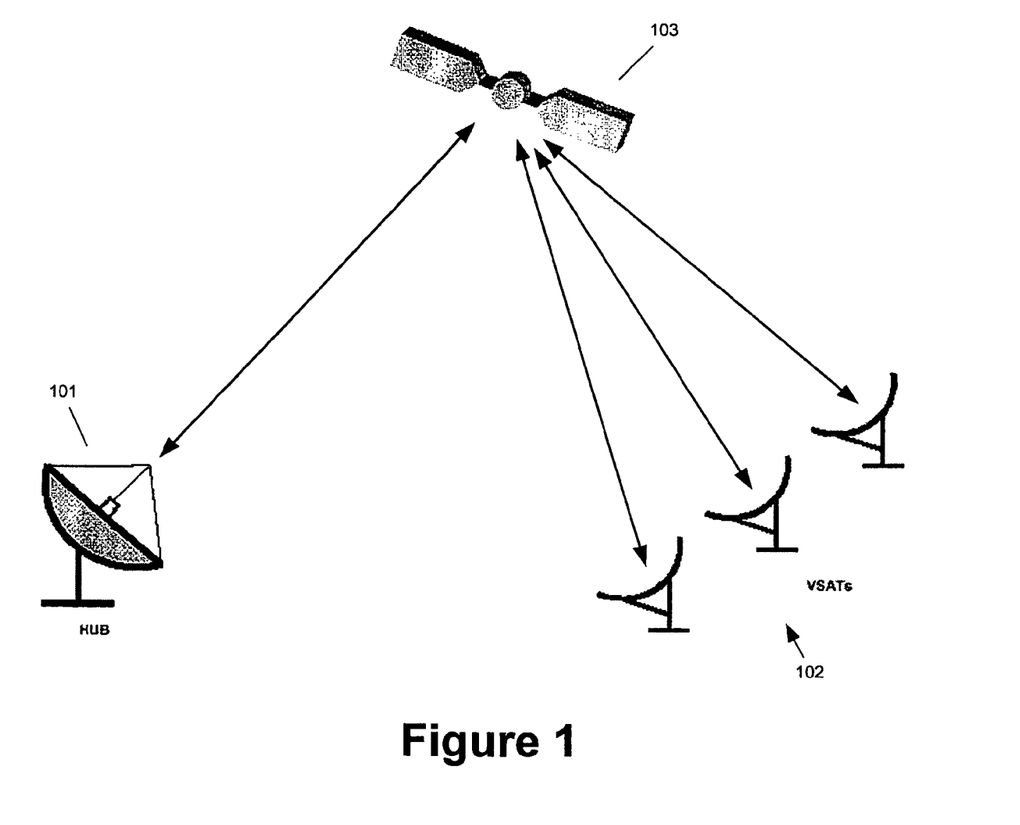
FIG. 1 shows an illustrative satellite communication system.

FIG. 1 shows an illustrative satellite network including a satellite 103, a hub 101, and a plurality of remote terminals 102 such as, but not limited to, VSATs. The hub 101 and the remote terminals 102 as shown embody a two-way data network in a star configuration. Messages from the hub 101 to the remote terminals 102 may be sent via a TDM signal on a forward or outbound channel that is broadcast to some or all of the remote terminals ("multicast" messages). Messages to specific ones of the remote terminals 102 ("unicast" messages) may also be multiplexed along with the "multicast" messages. The hub 101 may transmit via a standard DVB-S carrier, and may include a local DVB-S receiver that receives its own outbound transmission. The output data from the DVB-S receiver may be a standard MPEG transport stream.

The data from the remote terminals 102 to the hub 101 may be sent as a series of burst transmissions. Multiple access to the shared frequency-time resources may be implemented by allocating certain time slots and/or frequencies to the bursts, so that multiple access of messages from multiple remote terminals 102 will preferably not collide or otherwise interfere with one another. The bursts may be organized into a plurality of time slots, which may further be organized into a plurality of frames. The return link shared resources may be accessed in a TDMA or frequency and time division multiple access (FTDMA) manner. In the embodiment disclosed herein, the common outbound carrier is a DVB-S standard carrier (ETS 300 421), and the data is organized over MPEG frames containing 188 bytes. However, other data formats may be used.

As explained below, a remote terminal may re-construct slot and/or frame timing synchronization. There are two potential operating modes. In a first operational mode, time stamp messages may be transmitted from the hub to the remote terminals via the outbound carrier. This has some benefits, as will be seen later. A tradeoff is the overhead used by the time stamps. In a second operational mode, time stamps may be omitted altogether.

A remote terminal 102 such as a VSAT may transmit an initial burst to the hub 101. The burst may be an initial burst because the remote terminal has just been powered up, reset, or for other reasons. In any event, at this state the remote terminal is not necessarily synchronized with the hub in time and frequency. Especially where the remote terminal is not programmed with its geographical location, the timing may not be expected to be synchronized with the hub. Thus, there needs to be flexibility by the hub to receive the initial burst from the remote terminal regardless of the time and frequency of the initial burst. It can be expected, however, that the initial burst will fall somewhere within a known frequency range. The hub may thus have one or more receivers that are configured to be able to receive a data burst at any frequency within a known frequency range, at any start time. The receivers may be triggered to receive the burst data in response to sensing the start of transmission energy from the remote terminal.

Figure 4:
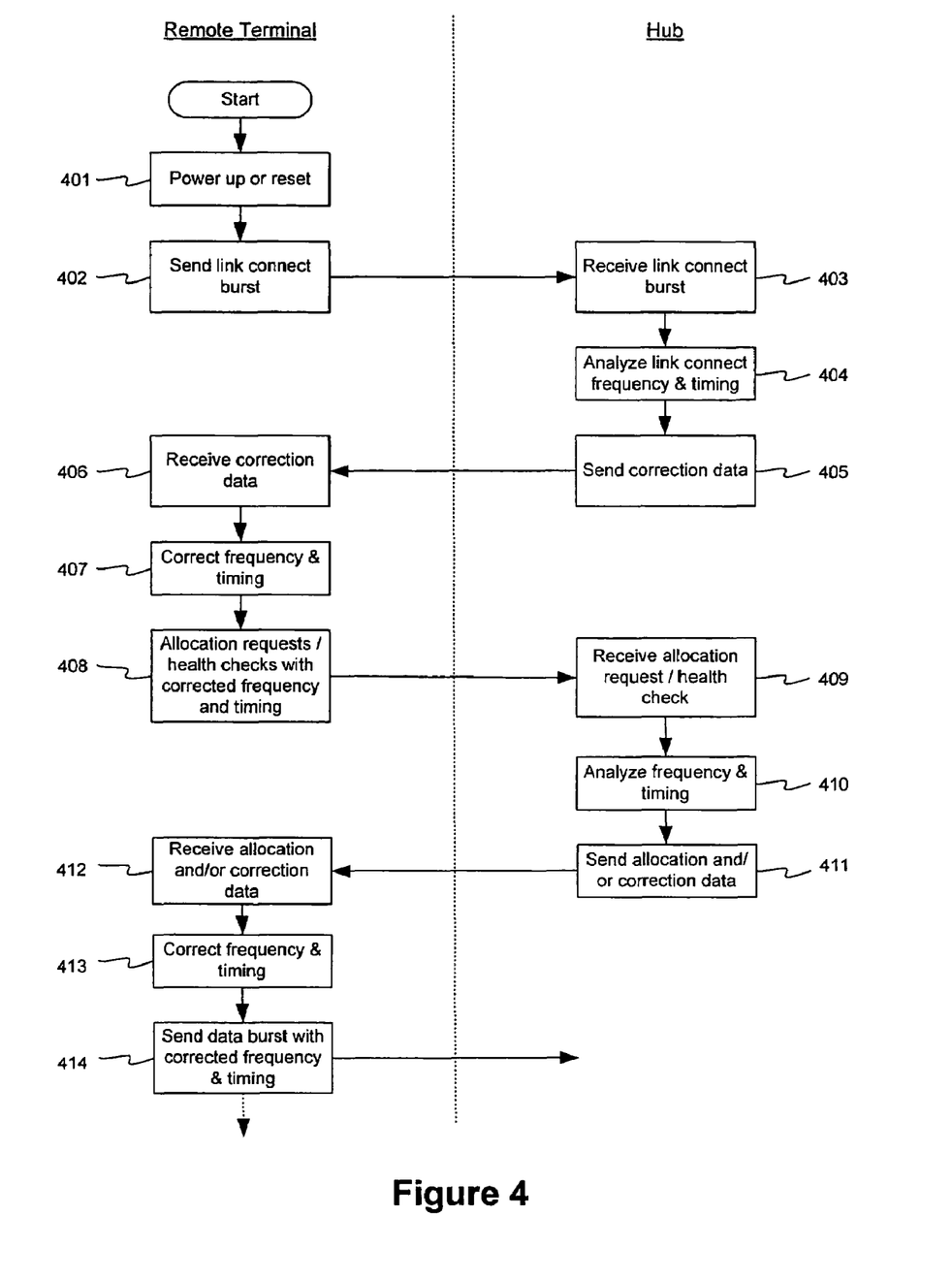
FIG. 4 is an illustrative flowchart showing communication between a remote terminal and a hub.

We will now address techniques wherein the remote terminal 102 transmits the initial burst prior to specific correction from the hub 101. We will refer to this initial burst transmission as a link connect transmission. Referring to FIG. 4, the remote terminal 102 may be powered up or reset (step 401), and may transmit an initial link connect burst transmission (step 402) to the hub 101, requesting access to network resources. The initial link connect burst transmission may be of any arbitrary frequency and timing, within a known frequency range. This is because the remote terminal 102 may have significant frequency error while transmitting, and the remote terminal may further not know the transmission distance (and thus propagation time) between the remote terminal 102 and the satellite 103 at the moment of transmission. The link connect burst transmission may be a random access transmission, operating in un-slotted Aloha mode, both in time and in frequency. When there are no time stamps, the local slot and frame synchronizations are arbitrary, and the remote terminal 102 cannot be assured that it will align its transmission with a slot, much less a particular pre-assigned slot. The first link connect transmission frequency may have a large frequency uncertainty of +/−F.

The hub 101 may receive the link connect burst transmission (step 403) regardless of the frequency and timing. To receive the link connect burst, a single receiver or a bank of multiple receivers may be employed in the hub 101 that can receive all burst transmissions within the frequency bandwidth of +/−F. To accomplish this, each receiver in the receiver bank may be configured to detect any burst transmission with a frequency error of at least up to half of the frequency channel spacing. Each receiver in the hub 101 may further be configured to successfully receive link connect bursts at any arbitrary burst-start timing within a slot. If the first link connect transmission is not to interfere with normal inbound data traffic, then at least 2*F of frequency bandwidth should be allocated for the first link connect transmissions only, and not be used for normal data traffic.

Figure 2:
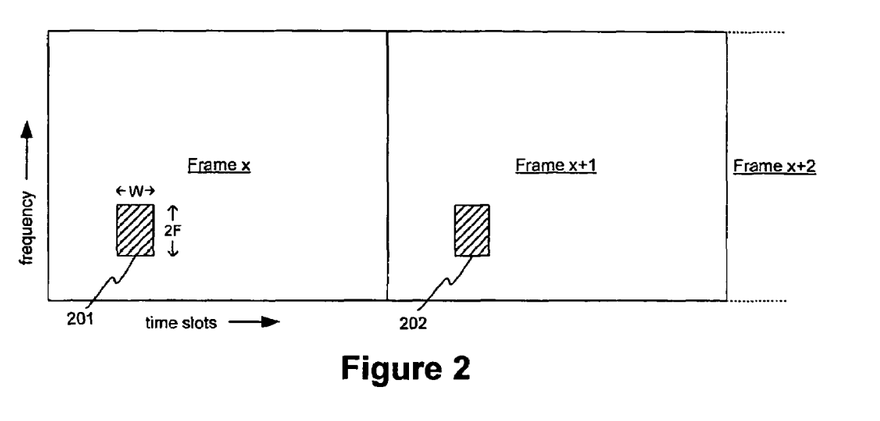
FIGS. 2, 3, and 6 are timing diagrams showing various frame portions.

For instance, referring to FIG. 2, a plurality of frames are shown in which one or more portions of a frame may be allocated as control channels for link connect bursts. Each frame includes a plurality of slots. Each frame/slot is also divided across a frequency range into a plurality of frequency channels. The hub 101 and the remote terminals 102 communicate within the time/frequency domain defined by the slot, frames, and frequency channels. Assume, for example, that the inbound time slot duration at the hub 101 is designed to be the duration time of transmitting some integer X MPEG-frames by the outbound carrier. The frame may include some integer Y of time slots. A counter at the hub may count X MPEG transmissions outbound, for extracting hub slot timing, and may count Y slots for hub frame timing. These timing pulses may be distributed to all hub receivers.

Optionally, time stamps may be transmitted by the hub 101 via the outbound carrier. According to U.S. Pat. No. 6,091,742 to Bassat et al., issued Jul. 18, 2000, and incorporated by reference herein as to its entirety, time stamps may be transmitted in an un-known multiplexing delay environment, such as IP encapsulation, via a DVB-S TDM carrier, and random delay may be corrected in accordance with information regarding a hub counter state when the previous time-stamp message was received at the Hub (for instance, by a local DVB-S receiver).

At the remote terminal 102, the DVB-S outbound is received, and local counters may count the received X MPEG messages to obtain first local slot timing and Y slots to obtain local frame timing. If time stamps are not transmitted outbound from by hub 101, these counters serve as the initial slot and frame timing, although the initial slot and frame timing is arbitrary.

However, if time stamps are transmitted by the hub 101, the reception of the time stamps and the added information of the time of reception (X and Y values) of the previous time stamp may allow the remote terminal to re-phase the X and Y local counters to synchronize with the reception of the time-stamps. This operation is possible because the remote terminal 102 can measure its own X and Y timing of reception of the previous time stamp and can compare it to the information that is received from the outbound about the X and Y timing of reception of the previous time stamp at the hub. Then, phase correction of the local X and Y counters may be performed by adding to the local counters the modulus of the difference in the counters.

When time stamps are transmitted within the outbound carrier, the X and Y counters at the remote terminal may track the hub slot and frame counters. However, the remote terminal time reference counters will be delayed by D', relative to hub timing, due to the delay of the outbound pass (as the transmission goes from the hub 101 toward the satellite 103, and from the satellite to the remote terminals 102, at about light speed). In a system where time stamps are not present, still the local slot and frame timings are at the correct speed, and only the time delay between the remote terminal timing and the hub timing is initially random and un-known to the remote terminals. Of course, when the hub 101 sends acknowledge reports to the remote terminals 102 on their timing errors (as discussed below), their timing may be corrected, regardless of whether time stamps are used.

Figure 3:
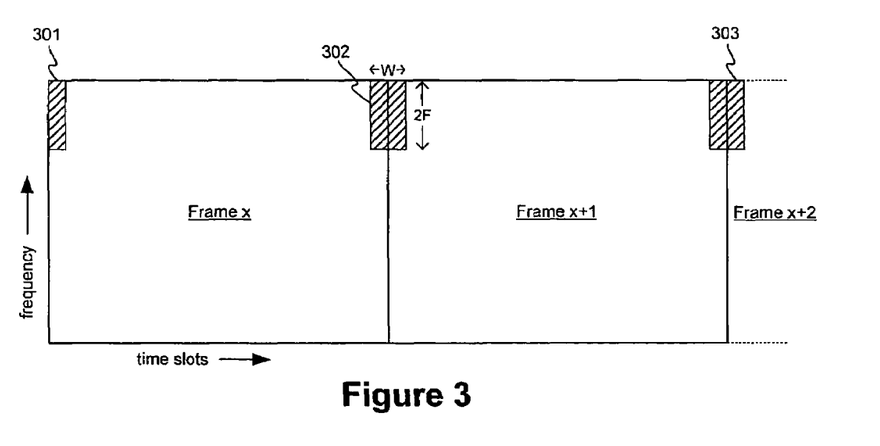
Figure 6:
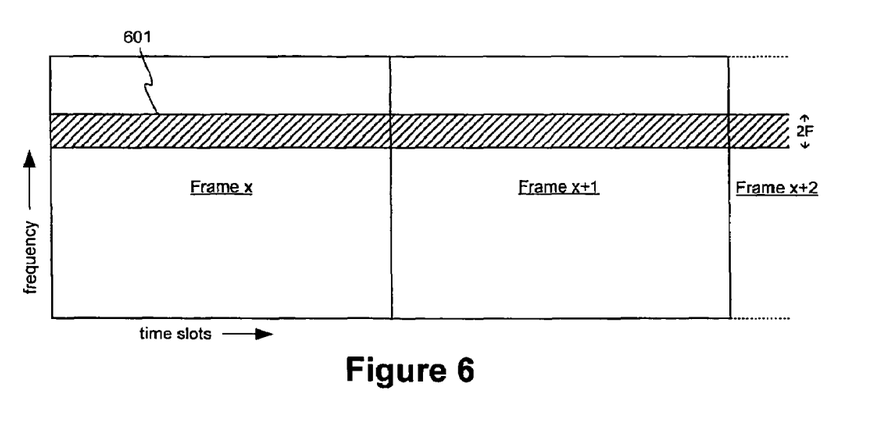

Assume, for example, that the time-frequency capacity available for a satellite network is a two-dimensional rectangle with time as one dimension and frequency as the other. Then, referring to FIG. 3, portion 201 in frame X (and corresponding portion 202 in frame X+1, and so on) may be allocated as one or more link connect zones over which the remote terminals 102 transmits their link connect burst transmissions. The allocated control channels may straddle frame borders, such as do portions 301, 302, and 303. In a system that does not incorporate time stamps in the outbound, so that frame timing is completely unknown—this two-dimensional space for a link-connect should preferably include a frequency range of at least 2*F along the frequency axis, and preferably the whole frame along the time axis (for example, the allocated frequency band 601 in FIG. 6). However, when time stamps are used, the minimal required time window W for the initial link-connect may be reduced, e.g., to about 40 milliseconds within a frame even without specifying a geographical location of the remote terminal, and to about, e.g., 2 milliseconds when geographic location information is provided.

In addition to the link connect allocated zone and the normal data traffic zone, there may further be a zone for control. This control zone may be used for, e.g., allocation requests, health check, and/or general control. The control zone may be multiple-accessed, such as by FTDM or using a contention-based approach (i.e. Slotted Aloha).

Continuing with the description in connection with FIG. 4, the hub 101 may analyze the link connect burst transmission (step 404) to determine what the frequency and timing of the link connect burst transmission are. Next, the hub 101 may send correction data to the remote terminal 102 indicating how much the remote terminal 102 needs to correct its timing and/or frequency (step 405). Thus, acknowledge messages from the hub 101 towards the remote terminal 102 may provide the remote terminal 102 data with content that is associated with, or otherwise specifies, the burst timing correction and/or the frequency correction that is needed. For example, the correction data may indicate a particular amount of frequency and/or a particular amount of time that the remote terminal 102 should adjust future transmissions by. By using the correction data, the remote terminal 102 may ensure that further inbound transmissions are be aligned with the slot and frame timing as well as the frequency grid.

In response to receiving the correction data (step 406), the remote terminal 102 may correct its timing and/or frequency (step 407). The remote terminal 102 may further send allocation requests and/or health-check indications from time to time using the control zone (step 408). Access to the control zone may be, e.g., contention-based and/or a TDM structure. The control bursts may be acknowledged with timing and/or frequency correction data, allowing the remote terminal 102 to track the correct timing and/or frequency grid. Thus, for example, if the remote terminal 102 needs to transmit new data, it may send an allocation request in the control zone (step 408). The hub 101 may receive the allocation request (step 409) and allocate some capacity of slots and frequencies for the transfer of that data in reservation mode. The hub 101 may further analyze the timing and/or frequency of the allocation request (or health check) and generate correction data (step 410). The hub 101 may then transmit an indication of the allocated slots and frequencies, along with the correction data, to the remote terminal (step 411). Then, the remote terminal 102 may receive the correction data and use it to correct, as needed, the timing and/or frequency of its subsequent transmissions (steps 412 and 413). In this way, the timing and/or frequency synchronization of the remote terminal 102 may be maintained over time. One channels are allocated to the remote terminal 102, the remote terminal 102 may use the allocated capacity to transfer data bursts (step 414). The remote terminal 102 may further piggy-back additional allocation requests on those data bursts.

This process of sending correction data may continue with each subsequent data burst. Alternatively, the correction data may be sent periodically or only in connection with the initial data burst. In summary, once the link connect burst from the remote terminal 102 is received by the hub 101, the hub 101 may acknowledge with frequency and/or burst timing correction data. This allows the next remote terminal inbound transmission to align with the frequency grid and with the slot and frame timing. Also, because of frequency and/or time drifts (e.g., from Doppler effects and path distance variations due to small perturbations in satellite locations), the remote terminal 102 may initiate an inbound transmission once in a while even if it does not have a need to transfer data to the hub 101, just for the sake of receiving updated frequency and timing corrections. We refer this traffic as "health check" bursts.

When the remote terminal 102 needs to transfer data, the remote terminal 102 may request capacity allocation from the hub 101. The remote terminal 102 may use a control channel for such a capacity request, unless it has already an allocation. The remote terminal 102 may piggy-back the allocation request onto a data transfer. The control channel may be used not only for allocation request but also for health check traffic and/or for general monitoring and control (M&C).

When time stamps are being sent and used, more useful information about the slot and frame timing is available to the remote terminals 102. However, the link connect burst may still reach the hub 101 delayed by unknown delay, since the distance of the satellite transmission hop (i.e., the distance between the remote terminal 102 and the satellite 103, and/or the distance between the satellite 102 and the hub 101) may be unknown due to the remote terminal 102, as the terminal may not know its specific geographical location.

Traditionally, in VSAT networks, the geographical location of each remote terminal 102 would be provided to the remote terminal, and the remote terminal 102 would transmit at a slot timing that would align the burst reception at the hub 101 with the slot and frame timing by taking into account the at least partially known satellite transmission hop distance. However, this operation can only partially succeed, since as the exact calculations of transmit burst timing will have to take into account not only the location of the remote terminal and the general location of the satellite, but also the precise momentary location of the satellite at a given point in time. The satellite 103 typically has a perturbation of location that cannot be ignored (e.g., on the order of about +/−1 millisecond when translated to delay perturbation). Moreover, the need to specify the geographical location to the remote terminal 102 adds to installation complexity, and is specially complicated for portable remote terminals.

However, it may be decided that the geographic location of the remote terminal 102 is not specified at all. In this case, the burst timing alignment for the extreme cases of the remote terminals, i.e. where the terminal would be nearest to the satellite and where the terminal would be farthest from the satellite, is known or can be determined. However, the difference between the two extremes turns out not to be large. For example, where the remote terminals 102 use an already-synchronized slot and frame counter in a system that includes time-stamps, the remote terminals 102 may generate slot and frame timing that is delayed from hub timing by D', where D' is the hub-to-remote terminal path delay. The remote terminals 102 may each transmit a link connect burst just 2*D milliseconds before its "local" frame start, where D is the average hop delay between the remote terminal and the hub, and is a common parameter to all remote terminals in the network. If all of the remote terminals 102 were to transmit the first link connect burst in that manner, the link connect bursts would be received at the hub 101 during some period of time that is spread around the frame start. This spread may typically be expected to be not more than, e.g., +/−20 milliseconds. Thus, in this example, it is seen that the link connect bursts would be expected to occur only around frame start and frame end, regardless of the geographic locations of the remote terminals 102.

Consider a frame that is, for example, one second long and contains one hundred slots that are each ten milliseconds long. Only the first two slots and the last two slots in this frame would be expected to contain a link connect burst, and a good practice would be to avoid allocating resources for normal inbound data at these particular slots within the frame. Where the initial frequency error is within +/−F, the portion allocated for the link connect burst would have a width W such that at least four slots (in this example) would be allocated within a frame of one hundred slots, and a number of frequency channels that covers the 2*F frequency uncertainty would also be allocated, for the link connect bursts. This is typically significantly lower than the minimal allocation that would be needed for link connect bursts in a system that does not use time stamps at all (where the width W would be the entire width of the frame), which demonstrates the benefits of the time-stamps. This is merely a minimum bound, in this example, for the capacity that needs to be allocated for link connect burst transmissions. The system designer may increase this allocation for link connect bursts as desired by letting the remote terminals randomly pick further delay perturbations from the nominal timing of 2*D milliseconds before local frame start at the remote terminal.

Some remote terminals 102 may be able to minimize the initial +/−F frequency inaccuracy dramatically, thus reducing the minimal space that should be kept for first link connect traffic. Such a technique may be particularly effective, for example, in remote terminals 102 equipped with phase locked-loop (PLL) synthesizers for synthesizing a frequency upon which the transmit frequency is based.

Figure 5:
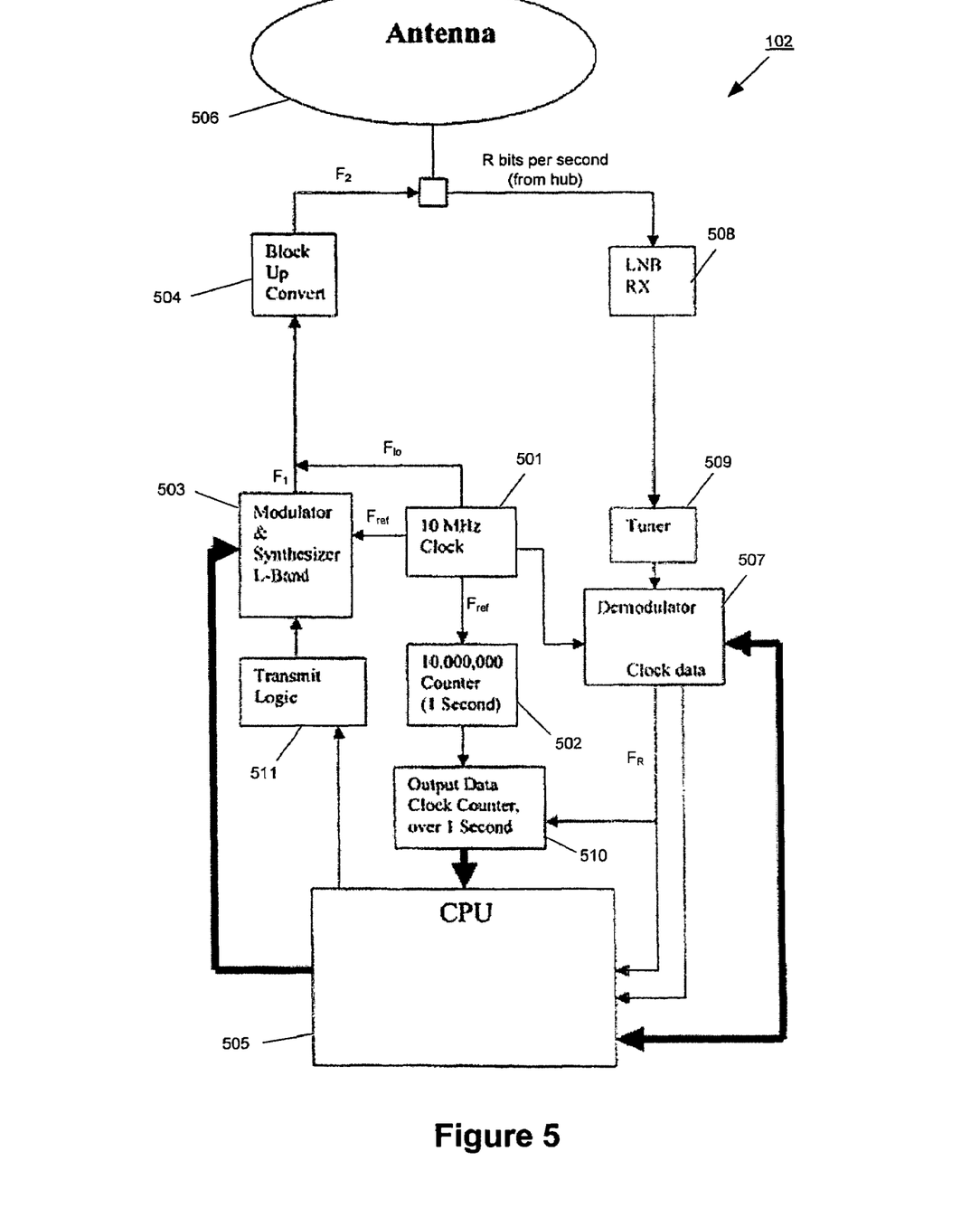
FIG. 5 is an illustrative functional block diagram of a remote terminal.

Referring to FIG. 5, an illustrative functional block diagram of a remote terminal 102 is shown. The remote terminal may include some or all of the elements shown in FIG. 5, including a reference frequency generator 501 such as a 10 MHz or other frequency clock, a counter 502, a processor 505 such as a CPU, a demodulator 507, a modulator/synthesizer 503, a block up converter 504, a low-noise-block (LNB) transmitter 508, a tuner 509, a counter 510, and/or various transmit logic 511. The remote terminal 102 may communicate with the hub 102 via the satellite 103 using an antenna 506 such as a satellite dish. In the illustrative embodiment of FIG. 5, a remote terminal 102 generates a frequency $F_1$ (e.g., in the L-Band range) using a PLL synthesizer (e.g., synthesizer 503) in an indoor unit (IDU) portion of the remote terminal 102. The PLL synthesizer 503 is locked on a local frequency reference clock 501 $F_{ref}$ (e.g., source 501 where $F_{ref}$ may be 10 MHz or some other frequency). The up-converter 504, which may be located near the antenna (e.g., 505) in an outdoor unit (ODU) portion of the remote terminal 102, converts frequency $F_1$ to a transmit frequency $F_2$ that is much higher (e.g., C-Band or Ku Band) and that is transmitted over the antenna 505 as the carrier frequency. The up-converter 504 may use a local oscillator with a constant frequency of $F_{lo}$. $F_{lo}$ may be locked on the same frequency $F_{ref}$ as the local reference clock. The IDU may transmit $F_1$ to the ODU by, for example, a coaxial cable, and may multiplex the $F_{ref}$ local reference clock on that same cable.

The final transmit frequency $F_2$ is related to the IDU transmit frequency $F_1$, and to the local oscillator frequency $F_{lo}$, by the formula: $F_2 = F_1 + F_{lo}$. Thus, the final transmission frequency $F_2$ depends upon a single local reference frequency source. To transmit at some desired $F_2$ frequency, the IDU programs the IDU synthesizer 503 to cause $F_1$ to be equal $F_2 - F_{lo}$. If the frequency $F_{ref}$ of the local reference clock was totally accurate, then $F_2$ would be produced without error. But in reality, the local reference clock frequency $F_{ref}$ is inaccurate. In general, $F_{ref} = 10*(1+E)$ MHz (for example, where the ideal $F_{ref}$ is 10 MHz), where E is a small signed fraction representing error. Because the transmission chain is entirely locked on the local reference frequency $F_{ref}$, the final transmit frequency will actually be $F_2*(1+E)$ instead of $F_2$, so the error will be $F_2*E$. One typical reason for the significant inaccuracy of the reference source in the IDU is that VSATS are often built to be reasonably priced and therefore use less expensive electronics than, for example, a hub. Another reason is that certain environmental factors such as temperature can affect the remote terminal local reference frequency.

To correct for errors in the transmit frequency, a "feature rate" of the broadcast transmission emitted from the hub 101 and received by the remote terminals 102 may be used as a globally-accurate clock reference. The feature rate of the transmission may be the data rate (e.g., bit rate), the baud rate, or the rate of any other feature of the transmission such as the rate at which MPEG start codes are periodically transmitted. Assume, for example, that the data from the hub 101 has a data bit rate of R bits per second. This data rate is typically very accurate because of the high quality of equipment used in the hub. Following FIG. 5, a certain predetermined number of pulses (e.g., ten million pulses of the local reference clock are counted by the counter 502 in order to determine a known period of time, such as a one second window or a window of some other length, related to the local reference clock. A reconstructed clock (such as a data-rate clock), which is based on a feature rate of the incoming transmission, of R pulses per second may be generated by the remote terminal's demodulator 507. During this one-second window, the data-rate clock pulses are counted by counter 510, measuring the number of clock pulses N of the data clock in this time window. The data-rate clock pulses may be read by CPU 505. If the frequency of the local reference clock is inaccurate by a factor of (1+E), then the one-second window is also inaccurate by a factor of 1/(1+E), and the number of pulses of the data-rate clock that will be counted will be $N=R(1/(1+E))$. Since R is known and N is measured, E can be calculated by the CPU 505. Once the fractional error E is calculated, then the CPU 505 may calculate the correct compensated frequency $F_1$ that would produce a desired $F_2$. The CPU 505 may make a calculation to offset the original $F_1$ by $F_2*E$, in order to transmit at a compensated frequency of $F_1 - E*F_2$, instead of the original erroneous $F_1$.

Alternatively, the counted window (e.g., a one-second window) may be determined by counting a predetermined number of pulses of the data-rate clock. For example, if it is known that the hub 101 transmits at a bit rate of R bits per second, then the reconstructed data-rate clock would be R pulses per second, and the remote terminal may count R pulses of the data-rate clock to determine a very accurate period of one second.

Thus, now that there is an accurate way to measure a certain period of time, the local reference frequency $F_{ref}$ may be measured by counting the number of pulses of $F_{ref}$ over the accurately measured period of time (e.g., one second). By counting the local reference frequency over the accurately measured period of time, the error E of the reference clock $F_{ref}$ may be determined by, e.g., the CPU 505. Say that the number of pulses of $F_{ref}$ actually counted over the measured period is N pulses. Then, the error E would be $E=(N-M)/M$, where M is the expected number of pulses of $F_{ref}$ if $F_{ref}$ were perfect. Once the fractional error E is calculated by the CPU 505, then the correct compensated $F_1$ may be calculated by the CPU 505 that would produce a desired $F_2$. A calculation may be made to offset the original $F_1$ by $F_2*E$, i.e. to transmit at a compensated frequency of $F_1 - E*F_2$, instead of the original erroneous $F_1$.

Note that the VSAT may count other periods of time less than or more than one second, such as a half second or two seconds. Moreover, the usage of the reconstructed data clock is merely illustrative. Other types of reconstructed clocks may be used, such as a byte clock, MPEG Sync, etc.

Thus, by measuring the ratio of two clocks (the local reference clock and the reconstructed clock), and by measuring one clock against the other, the local reference frequency error may be determined with respect to a reconstructed clock. In doing so, the synthesized frequency error may be compensated for such that the local frequency clock error is reduced, minimized, or even totally canceled.

There are many alternative ways to measure the frequency ratio between the local reference clock and the reconstructed feature clock. For instance, the demodulator 507 may receive the local reference clock $F_{ref}$, or a clock derived from the local reference clock, such as a clock having a frequency that is a multiple of the local reference clock. The demodulator 507 may also be programmed with a parameter indicating the known nominal feature rate, such as the symbol rate, for example, of the incoming transmission. The demodulator 507 may have a tracking algorithm, and may track the actual instantaneous value of the feature rate of the incoming transmission, using the rate of the local reference clock (or the clock derived from the local reference clock). As a result, it may be possible to read from the demodulator a measured value of the reconstructed feature rate. Comparing the nominal feature value to the reconstructed feature rate read-out of the demodulator reveals the local reference clock deviation relative to the actual feature rate of the incoming transmission. Suppose we read from the demodulator 507 the value of a reconstructed feature rate Ro, where the nominal feature value is R. Then the fractional frequency error of the reference compared to the feature rate is E=1−Ro/R., and the outgoing transmission can be compensated accordingly.

While illustrative systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. In addition, aspects of the invention have been pointed out in the appended claims, however these claims are illustrative in that the invention is intended to include the elements and steps described herein in any combination or sub combination. It will also be appreciated and understood that modifications may be made without departing from the true spirit and scope of the invention.

What is claimed is:

1. In a remote terminal of a satellite network, a method for adjusting an outgoing transmission carrier frequency based on a feature rate of an incoming transmission comprising:
   generating a reconstructed clock from the incoming transmission;
   counting a predetermined number of pulses of a locally-generated reference clock to determine a period time;
   counting a number of pulses N of the reconstructed clock during the same period of time, wherein the outgoing transmission carrier frequency is a function of at least the locally-generated reference clock;
   comparing the number of pulses N counted of the reconstructed clock to determine an error E such that N=R*(1/(1+E)), wherein R is an expected feature rate of the incoming transmission; and
   adjusting the outgoing transmission carrier frequency based on the error.

2. The method of claim 1, wherein the step of adjusting includes upconverting the outgoing transmission carrier frequency to a higher carrier frequency.

3. The method of claim 2, wherein the higher carrier frequency is in the C-band or the Ku-band.

4. The method of claim 1, wherein the outgoing transmission carrier frequency is in the L-band.

5. The method of claim 1, wherein adjusting the outgoing transmission carrier frequency includes adjusting the outgoing transmission carrier frequency to compensate for the error.

6. The method of claim 1, wherein the incoming transmission is from a hub of the satellite network.

7. The method of claim 1, wherein the feature rate is the baud rate of the incoming transmission.

8. The method of claim 1, wherein the feature rate is the data rate of the incoming transmission.

9. The method of claim 1, wherein the feature rate is a rate of MPEG blocks in the incoming transmission.

10. The method of claim 1, further including:
    providing a clock based on a locally-generated reference clock to a demodulator; and
    reading the feature rate value from the demodulator.

11. A remote terminal of a satellite network, comprising:
    a receiver configured to receive an incoming transmission;
    a processor coupled to the receiver and configured to adjust a carrier frequency of an outgoing transmission based on a feature rate of the incoming transmission;
    a modulator coupled to the processor and configured to generate the outgoing transmission; and
    a local reference clock generator coupled to the processor and configured to generate a reference clock, wherein the processor is configured to:
       generate a reconstructed clock from the incoming transmission,
       count a predetermined number of pulses N of the reconstructed clock to determine a period time,
       count a number of pulses of the reference clock during the same period of time,
       determine an error E based on the number of pulses N counted of the reconstructed clock such that N=R*(1/(1+E)), wherein R is an expected feature rate of the incoming transmission, and
       control the modulator to adjust the outgoing transmission carrier frequency based on the error.

12. The remote terminal of claim 11, further including an upconverter coupled to the modulator and configured to upconvert the outgoing transmission.

13. The remote terminal of claim 11, wherein the processor is configured to control the modulator to adjust the carrier frequency of the outgoing transmission to compensate for the error.

14. A remote terminal of a satellite network, comprising:
    a receiver configured to receive an incoming transmission;
    a processor coupled to the receiver and configured to adjust a carrier frequency of an outgoing transmission based on a feature rate of the incoming transmission;
    a modulator coupled to the processor and configured to generate the outgoing transmission; and
    a local reference clock generator coupled to the processor and configured to generate a reference clock, wherein the processor is configured to:
       generate a reconstructed clock from the incoming transmission,
       count a predetermined number of pulses of the reference clock to determine a period time,
       count a number of pulses N of the reconstructed clock during the same period of time,
       determine an error E based on the number of pulses N counted of the reconstructed clock such that N=R*(1/(1+E)), wherein R is an expected feature rate of the incoming transmission, and
       control the modulator to adjust the outgoing transmission carrier frequency based on the error.

15. A method in a remote terminal part of a satellite network, comprising:
    transmitting a first burst from the remote terminal, wherein the first burst is aligned with frame timing with at least some timing error due to a difference of geographic delays within the satellite network;

receiving, at the remote terminal, a transmission including correction data responsive to the first burst;

receiving time stamp transmissions;

reconstructing, at the remote terminal, slot and frame rates from a feature rate of the transmission including correction data without the remote terminal receiving external information about a geographic location of the remote terminal; and transmitting a second burst corrected in at least one of frequency or time in accordance with the correction data.

* * * * *